(12) United States Patent
Tuttle

(10) Patent No.: US 8,602,345 B2
(45) Date of Patent: Dec. 10, 2013

(54) SANITARY ROLL PAPER TOWEL HOLDER

(76) Inventor: Billy W. Tuttle, Burlington, KY (US)

( * ) Notice: Subject to any disclaimer, the term of this patent is extended or adjusted under 35 U.S.C. 154(b) by 0 days.

(21) Appl. No.: 13/374,990

(22) Filed: Jan. 27, 2012

(65) Prior Publication Data

US 2013/0193261 A1 Aug. 1, 2013

(51) Int. Cl.
*B65H 16/04* (2006.01)
*B65H 59/02* (2006.01)

(52) U.S. Cl.
USPC ..................................... 242/597.7; 242/422.5

(58) Field of Classification Search
USPC ............. 242/597.7, 422, 422.4, 422.5, 129.8, 242/130.2, 149, 156, 156.1
See application file for complete search history.

(56) References Cited

U.S. PATENT DOCUMENTS

| | | | | |
|---|---|---|---|---|
| 1,242,927 A * | 10/1917 | Du Brul | ..................... | 242/156.1 |
| 1,518,749 A * | 12/1924 | Nelson | ....................... | 242/597.7 |
| 3,048,348 A * | 8/1962 | Griffin | ....................... | 242/422.5 |
| 5,788,136 A * | 8/1998 | Othman | ..................... | 242/597.7 |
| 6,832,739 B1 * | 12/2004 | Kraus | ......................... | 242/422.5 |
| 7,559,504 B2 * | 7/2009 | Yang et al. | ................. | 242/597.7 |
| 2002/0130211 A1* | 9/2002 | Kerr | ............................ | 242/422.5 |
| 2003/0019975 A1 | 1/2003 | Delfino | | |
| 2004/0159738 A1* | 8/2004 | Duncan et al. | ............. | 242/597.7 |
| 2007/0158489 A1 | 7/2007 | Anderson | | |
| 2007/0176043 A1* | 8/2007 | Yu | .............................. | 242/597.7 |

* cited by examiner

*Primary Examiner* — William A Rivera
(74) *Attorney, Agent, or Firm* — Hasse & Nesbitt LLC; Daniel F. Nesbitt

(57) ABSTRACT

A holder and dispenser of paper towels or the like that includes a base, a first post attached to the base for receiving a roll of paper towels or the like, a second post attached to the base in substantially parallel spaced relationship to the first post, a clamping rod for contacting the outer surface of a roll of paper, a plurality of pivot arms pivotally attached at respective first ends thereof to the second post and at respective second ends thereof to the clamping rod whereby said clamping rod is pivotable with respect to the second post for contacting an outer surface of a roll of paper disposed on the first post. This invention solves the problem Contamination or waste of the paper roll is avoided by providing a self adjusting vertical clamp bar to restrain the roll of paper in order to remove a towel segment from the roll.

7 Claims, 2 Drawing Sheets

SANITARY ROLL PAPER TOWEL HOLDER

CROSS-REFERENCE TO RELATED APPLICATIONS

This application claims the benefit of co-pending U.S. Provisional Application No. 61/462,342, filed Feb. 2, 2011, the disclosure of which is incorporated herein by reference in its entirety.

FIELD OF THE INVENTION

This invention relates generally to household tools, gadgets and conveniences, and more particularly to an improved holder/dispenser for rolls of paper towels or other paper products in the form of rolls.

BACKGROUND OF THE INVENTION

This invention evolved from the use of a roll of paper towels during a summer cookout. The guests had difficulty tearing off an individual sheet with wet hands. The towels became contaminated (or wet), were wasted from excess use, and the roll tended to unroll under the force of wind. The inventor thought it necessary to keep the roll under control while being used to prevent waste of the paper and to avoid contamination of the roll.

The objective of this invention is to keep a roll of paper towels under control while eliminating waste and contamination of the roll. To solve the problem the inventor developed a method to keep the roll of paper towels upright and restrained while restricting minimum hand contact with the roll of paper. The purpose of the roll paper towel holder according to the invention is to control the roll in position while removing sheets from the roll by hand.

The typical paper roll holder existing prior to the present invention has a center post that allows the roll of paper to fit over and maintain its position. To remove a sheet, one hand is used to hold the roll in place while pulling a sheet from the roll. The disadvantage is, the hands could be wet or have other substances on them that can be transferred to the roll, thereby contaminating the roll. The sheets are also free to fall away or unravel due to the force of a breeze in the area. The sheets will fall away under their own weight, making it look unsightly.

SUMMARY OF THE INVENTION

The paper towel holder and dispenser according to the invention includes a base that allows to support a roll of towels, a center post mounted on the base, typically in the center of the base, that fits through the center core of the roll of paper towels and keeps it uprights, a vertical clamp bar that applies force to the outer surface of the paper roll, a rear mounting post for pivotally supporting pivot arms interconnecting the rear mounting post and the clamp bar, using screws or pins that allow the pivot arms to move (pivot at each end) under the weight of the clamp bar.

The present invention provides a holder and dispenser for a roll of paper towels or the like, comprising: a base; a center post having a distal end and a base end attached to the base, for receiving and supporting a roll of paper that rotates around the center post; a rear mounted post having opposite sides, a distal end and a base end attached to the base, the rear mounted post being fixed in substantially parallel spaced relationship to the center post; a clamp bar having opposed sides, a distal end and a base end; a pair of first pivot arms pivotally attached at a first end to opposite sides of the rear mounted post near its distal end, and at a second end to the opposite sides of the clamp bar near its distal end; and a pair of second pivot arms pivotally attached at a first end to the opposite sides of the rear mounted post toward its base end, and at a second end to the opposite sides of the clamp bar toward its base end, wherein the clamp rod is pivotable with respect to the rear mounting post.

An aspect of the present invention provides a holder and dispenser wherein the clamp bar is pivotable with respect to the second post under the force of gravity.

Another aspect of the present invention provides a holder and dispenser comprising a plurality of, including four, pivot arms attached between the rear mounting post and the clamp bar so as to maintain the clamp bar substantially parallel to the rear mounting post.

A further aspect of the present invention provides a holder and dispenser wherein the clamp bar has weight sufficient to apply a force to the outside surface of the roll, thereby keeping the paper towel sheets tight against roll, and preventing the paper towel roll sheets from inadvertently unrolling or unraveling, and to provide force to a roll of paper towels adequate to allow removal by a user of a section of a roll of paper using one hand.

BRIEF DESCRIPTION OF THE DRAWINGS

The invention will be more fully understood by a reading of the following detailed description of the invention read in conjunction with the accompanying drawing figures that form a part of this application and wherein.

DETAILED DESCRIPTION OF THE INVENTION

Figure 1:
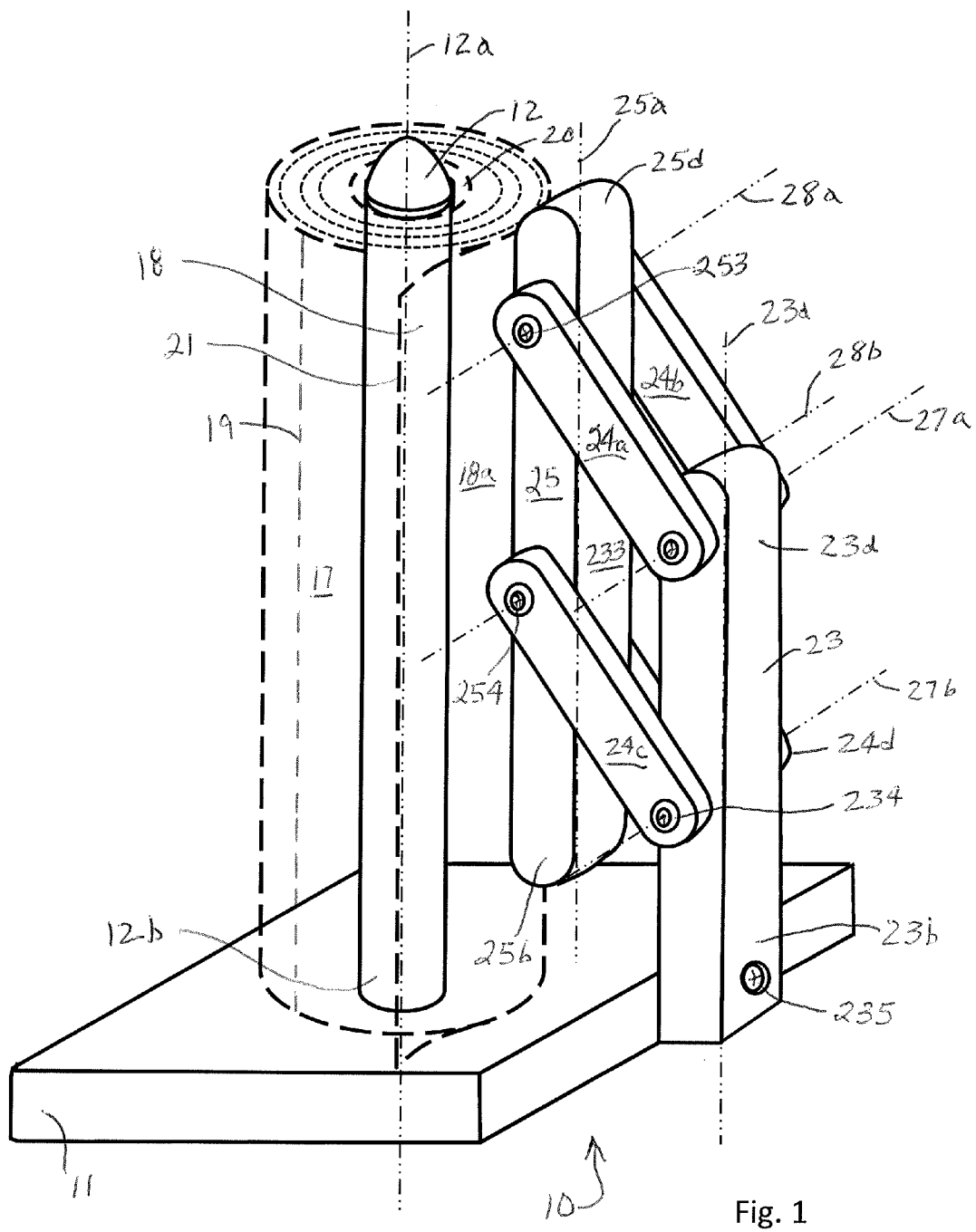
FIG. 1 is a perspective view of an embodiment of a holder and dispenser having a roll of paper towels disposed thereon.
Figure 2:
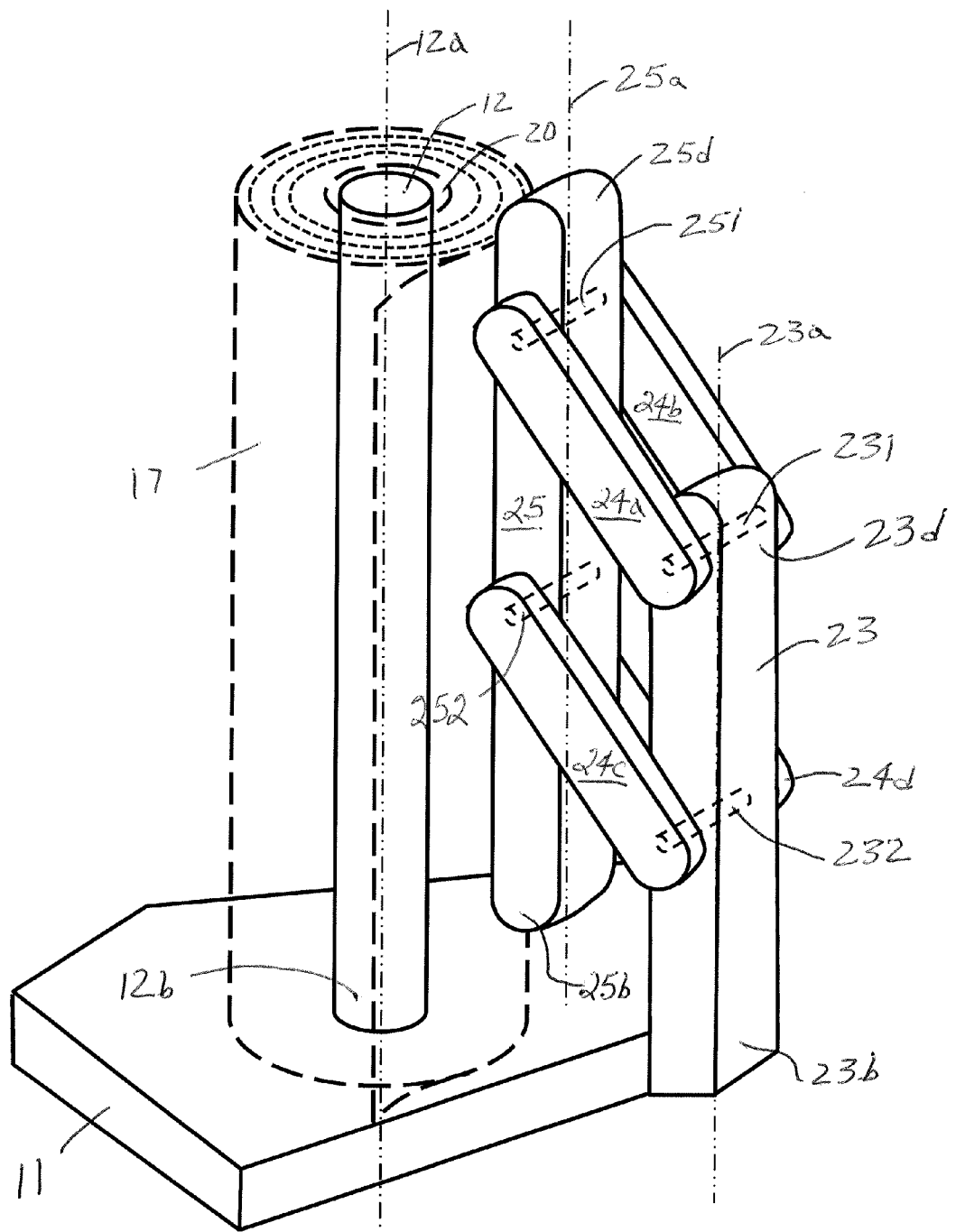
FIG. 2 is a perspective view of another embodiment a holder and dispenser having a roll of paper towels disposed thereon.

Referring now to the drawings, FIGS. 1 and 2 show embodiments of a towel holder 10 (sanitary roll paper holder) comprising a base 11 for supporting other components on a flat surface (not shown), including a center post 12 having a base end 12b attached to the base 11 using any suitable attaching means, such as a screw that holds the center post in place from the bottom. A roll of paper such as paper towel roll 17, which comprises a plurality of individual paper towels 18 defined between and separable along perforations 19, has a sleeve 20 that fits over the center post 12. Roll 17 is free to rotate on post 12 when a first towel 18a is manually pulled at its leading edge 21, shown in FIG. 1.

A rear mounting post 23 has a distal end 23d and a base end 23b attached to the base 11 using any suitable attaching means, such as a screw 235 shown in FIG. 1. The rear mounting post 23 holds pivot arms 24 that mount between the rear mounting post 23 and a clamp bar 25.

The pivot arms 24 are held in place, pivotally free, to the rear mounting post 23 and to the clamp bar 25, to allow movement of the clamp bar 25 relative to the fixed rear mounting post 23. The pivot arms 24 can be held pivotally in place, on opposite ends, with pairs screws 233, 234 to the rear mounting post 23, and with pairs of screws 253, 254 to the clamp bar 25 as shown in FIG. 1. Screw(s) 233 hold one end of pivot arms 24a and 24b to the opposite sides of the distal end 23d of the rear mounting post 23 for pivoting along an axis 27a, while screw(s) 253 hold the other end of pivot arms 24a and 24b to the opposite sides of a distal end 25d of the clamp bar 25 for pivoting along an axis 28a. Similarly, screw(s) 234 hold one end of pivot arms 24c and 24d to the opposite sides toward the base end 23b of the rear mounting post 23 for pivoting along an axis 27b, while screw(s) 254 hold the other end of pivot arms 24c and 24d to the opposite sides toward a base end 25b of the clamp bar 25 for pivoting along an axis 28b.

The pivot arms 24 can also be pivotally held in place, on opposite ends, with pivot pins 231,232 that freely rotate within holes (bores) through the rear mounting post 23 disposed near the distal end 23d and toward the base end 23b, respectively, and with pivot pins 251,252 that freely rotate within holes through the clamp bar 25 disposed near the distal end 25d and toward the base end 25b, respectively, as shown in FIG. 2.

Implicit in FIGS. 1 and 2 are the arrangement of the pivotal attachments of the pairs of pivot arms 24 to the center post 12 and the rear mounting post 23, such that pivotal movement of the pivot arms 24 result in the center axis 25a of the clamp bar 25 to remain at a same angle, typically parallel, with the center axis 23a of the rear mounting post 25, and with the center axis 12a of the center post 12. It is also implicit in FIGS. 1 and 2 that the center axis 25a of the clamp bar 25 lies along a plane through the center axis 12a of the center post 12 and the center axis 23a of the rear mounting post 25. It is also implicit in FIGS. 1 and 2 that the two pairs of pivot arms pivot in respective planes that are parallel with a plane through the axis of the center post and the axis of the rear mounted post.

The weight of clamp bar 25 applies force (due to gravity) to the outside surface of the roll 17, thereby keeping the paper towel sheets 18 tight against roll 17, and preventing the paper towel roll sheets from inadvertently unrolling or unraveling. As a sheet 18 is removed, and additional sheets are removed, the roll 17 gets correspondingly smaller in diameter, and the clamp bar 25 will self-adjust by pivoting under the force of gravity toward the roll 17 to keep force on the roll 17.

In an alternative use of the invention, to remove a sheet 18 from the roll 17, one finger can be used to apply extra downward force on the clamp bar 25, thus better keeping the roll 17 secure from rotation while pulling an end sheet 18a off the roll 17. This avoids using contaminated hands to hold the roll 17 in place while removing a sheet 18, thereby always keeping the roll 17 clean and sanitary for continued use.

Advantages of the invention include, the roll of paper is kept sanitary while being used; the use of one hand to restrain the roll while pulling on a single sheet is not necessary, thereby preventing the roll from being contaminated with the hand used to restrain the roll. The device is user friendly by keeping the next sheet in position for ease of handling and less effort to remove a sheet. Waste is avoided by forcing the next sheet on the roll to separate from the roll at the clamp bar location and prevents unnecessary unwanted sheets from being pulled away from the roll and keeps the sheets in place as the roll is used up. The clamp bar is self adjusting for different roll sizes as the roll is used up.

What is claimed is:

1. A holder and dispenser for a roll of paper towels, comprising
   a base;
   a center post having a distal end and a base end attached to the base, for receiving and supporting a roll of paper that rotates around the center post;
   a rear mounting post having opposed sides, a distal end and a base end attached to the base, the rear mounting post being in substantially parallel spaced relationship to the center post;
   a clamp bar having opposed sides, a distal end and a base end;
   a pair of first pivot arms pivotally attached at a first end to the opposite sides of the rear mounting post near its distal end, and at a second end to the opposite sides of the clamp bar near its distal end; and
   a pair of second pivot arms pivotally attached at a first end to the opposite sides of the rear mounted post toward its base end, and at a second end to the opposite sides of the clamp bar toward its base end, wherein the clamp rod is pivotable with respect to the rear mounting post.

2. The holder and dispenser according to claim 1 wherein the clamp rod is pivotable in a vertical plane with respect to the rear mounting post under a force of gravity.

3. The holder and dispenser according to claim 1 wherein the clamp rod is disposed substantially parallel to the rear mounting post.

4. The holder and dispenser according to claim 3 wherein the clamp bar has weight sufficient to apply a force to the outside surface of the roll, thereby keeping the paper towel sheets tight against roll, and preventing the paper towel roll sheets from inadvertently unrolling or unraveling.

5. The holder and dispenser according to claim 1, wherein the clamp bar has a center axis and the rear mounted post has a center axis and wherein the two pairs of pivot arms pivot in respective planes that are parallel with a plane through the axis of the center post and the axis of the rear mounted post.

6. The holder and dispenser according to claim 1, wherein the pivot arms are pivotally attached to the rear mounting post and to the clamp bar with screws.

7. The holder and dispenser according to claim 1, wherein the pivot arms are pivotally attached to the rear mounting post and to the clamp bar with pins.

\* \* \* \* \*

UNITED STATES PATENT AND TRADEMARK OFFICE
CERTIFICATE OF CORRECTION

Page 1 of 1

PATENT NO.        : 8,602,345 B2
APPLICATION NO.   : 13/374990
DATED             : December 10, 2013
INVENTOR(S)       : Billy W. Tuttle It is certified that error appears in the above-identified patent and that said Letters Patent is hereby corrected as shown below:

Title page, add:

--RELATED U.S. APPLICATION DATA
  (60) Provisional application No. 61/462,342, filed on Feb. 02, 2011--

Signed and Sealed this
Sixteenth Day of February, 2016

Michelle K. Lee
*Director of the United States Patent and Trademark Office*